(12) United States Patent
Olofsson et al.

(10) Patent No.: US 7,992,358 B2
(45) Date of Patent: Aug. 9, 2011

(54) GUIDING MEANS AT A JOINT

(75) Inventors: Ola Olofsson, Trelleborg (SE); Ulf Palmblad, Lund (SE)

(73) Assignee: Pergo AG, Baar (CH)

( * ) Notice: Subject to any disclaimer, the term of this patent is extended or adjusted under 35 U.S.C. 154(b) by 1369 days.

(21) Appl. No.: 09/910,960

(22) Filed: Jul. 24, 2001

(65) Prior Publication Data

US 2002/0127051 A1    Sep. 12, 2002

Related U.S. Application Data

(63) Continuation-in-part of application No. 09/601,573, filed as application No. PCT/SE99/00128 on Feb. 1, 1999, now abandoned.

(30) Foreign Application Priority Data

Feb. 4, 1998 (SE) ........................ 9800311

(51) Int. Cl.
*E04B 2/00* (2006.01)
*B23Q 1/48* (2006.01)

(52) U.S. Cl. ...................... 52/582.1; 403/381

(58) Field of Classification Search ............. 52/582.1, 52/586.1, 591.1, 591.3, 591.4, 592.1, 592.2; 403/268, 375, 381
See application file for complete search history.

(56) References Cited

U.S. PATENT DOCUMENTS

| 752,694 | A | | 2/1904 | Lund |
|---|---|---|---|---|
| 2,004,193 | A | * | 6/1935 | Cherry ................. 52/592.1 X |
| 2,238,169 | A | | 4/1941 | Heyn et al. |
| 4,672,728 | A | | 6/1987 | Nimberger |
| 4,920,626 | A | | 5/1990 | Nimberger |
| 5,165,816 | A | | 11/1992 | Parasin |
| 5,292,155 | A | | 3/1994 | Bell et al. |
| 5,295,341 | A | * | 3/1994 | Kajiwara |
| 5,618,602 | A | * | 4/1997 | Nelson ................. 52/591.1 X |
| 5,706,621 | A | * | 1/1998 | Pervan |
| 5,797,237 | A | * | 8/1998 | Finkell, Jr. ............ 52/586.1 X |
| 6,006,486 | A | * | 12/1999 | Moriau et al. ......... 52/586.1 X |
| 6,101,778 | A | * | 8/2000 | Martensson ............ 52/582.1 |
| 6,182,410 | B1 | * | 2/2001 | Pervan |
| 6,247,285 | B1 | | 6/2001 | Moebus |

FOREIGN PATENT DOCUMENTS

| DE | 3319235 | 11/1984 |
|---|---|---|
| JP | 1178659 | 7/1989 |
| WO | 9426999 | 11/1994 |
| WO | 9627721 | 9/1996 |
| WO | 9747834 | 12/1997 |

OTHER PUBLICATIONS

International Search Report.

* cited by examiner

*Primary Examiner* — Victor Macarthur
(74) *Attorney, Agent, or Firm* — Novak Druce + Quigg LLP

(57) ABSTRACT

A guiding means at a joint comprising groove (1) and tenon (2) preferably intended to be joined with glue. The tenon (2) and/or groove (1) includes guiding wedges (3).

15 Claims, 2 Drawing Sheets

GUIDING MEANS AT A JOINT

CROSS REFERENCE TO RELATED APPLICATIONS

This application is a continuation-in-part of application Ser. No. 09/601,573, filed Aug. 4, 2003, which is a 35 USC §371 application of International Application PCT/SE99/00128, filed Feb. 1, 1999, claiming benefit of Swedish Patent Application No. 9800311-4, filed Feb. 4, 1998.

BACKGROUND OF THE INVENTION

1. Field of the Invention

The present invention relates to a guiding means at a joint comprising groove and tenon, preferably intended to be joined with glue.

2. Description of the Related Art

Prefabricated floorboards which at their edges are provided with groove and tenon are well known nowadays. As these are very easy to install it is possible for the normal handy man to achieve this. These type of floors can be constituted of massive wood, fibre board or particle board. These are often provided with a surface layer, such as lacquer or some sort of laminate. The boards are most often installed by gluing them together via their groove and tenon. It is desired to join the separate boards so closely that the joint becomes practically invisible, which increases the moisture resistance radically. The usable life of the installed floor is hereby also increased. In order to achieve a tight joint, it is essential that glue is used excessively. The clearance in the joint will therefore have to be relatively large in order to be able to force the boards together without having to use special equipment due to the forces that would be needed otherwise. A small clearance will cause a hydraulic resistance caused by the glue captured inside the groove during the joining. The clearance needed will however cause a random discrepancy in the levels between adjacent floorboards. This discrepancy in levels will lead to an increased wear at the joint and that moisture may penetrate the joint. The decorative wear layer, often constituted by lacquer or laminate will hereby often be worn down closest to the joint. The wood fibre will hereby be naked closest to the joint, which in addition to be being unsightly also may cause the fibres to swell when exposed to moisture. This causes the surface layer to rise closest to the edges whereby these edges will be exposed to further wear, which will decrease the useful life of the floor radically.

SUMMARY OF THE INVENTION

It has, through the present invention, quite unexpectedly been possible to solve the above mentioned problems so that the risk for error during installation is radically reduced, whereby the average usable life of the floor, with a guiding means according to the present invention, is considerably increased. Accordingly, the invention relates to a guiding means at a joint comprising groove and tenon preferably intended to be joined with glue. The invention is characterised in that the tenon and/or groove includes guiding wedges. The guiding means preferably forms a part of boards intended to, together form a floor. The core of the boards is constituted by a fibre board or a particle board. At least the upper side of the board is constituted by a decorative thermosetting laminate. The fitting clearance between the tenon and the groove includes a first fitting clearance and a second, guiding, fitting clearance. The second, guiding, fitting clearance is obtained through the guiding wedges. The first fitting clearance comprises the main part of the fit and the second, guiding fitting clearance comprises a smaller part of the fit. The first fitting clearance is in the range 0.1-1 mm, preferably 0.1-0.5 mm, while the second, guiding, fitting clearance is in the range 0.01-0.2 mm, preferably 0.02 0.1 mm.

According to one embodiment of the invention the guiding wedges are arranged perpendicular to the extension of the joint.

According to another embodiment of the invention the guiding wedges are arranged parallel to the extension of the joint.

The surfaces of the joint is provided with recesses so that cavities are formed in the joint. The cavities are intended to receive the glue used during the joining.

BRIEF DESCRIPTION OF THE DRAWINGS

The invention is further illustrated together with enclosed figures showing different embodiments of the invention whereby.

DETAILED DESCRIPTION OF THE PREFERRED EMBODIMENTS

Figure 1:
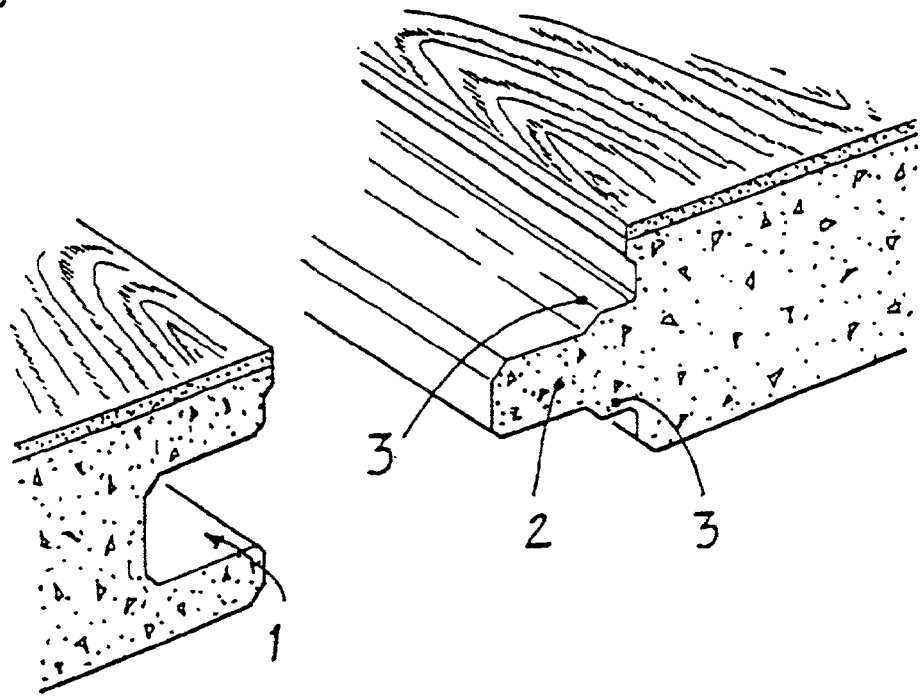
FIG. 1 shows, in perspective view, a first embodiment of a guiding means at a joint, according to the invention.
Figure 2:
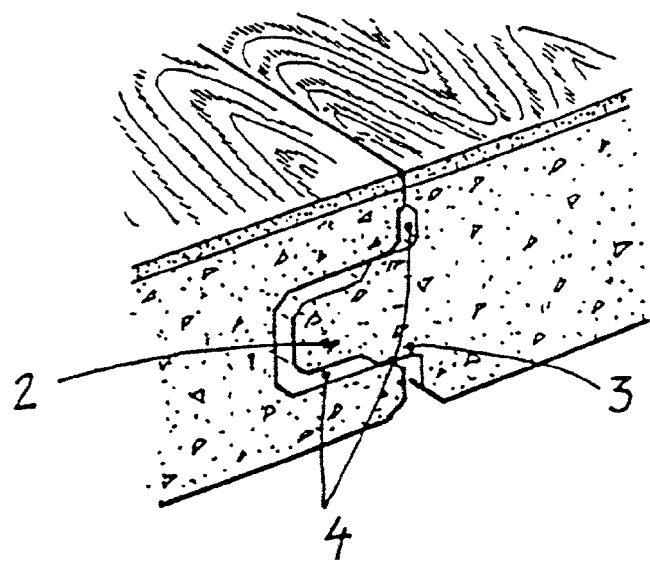
FIG. 2 shows, in perspective view, the embodiment form FIG. 1 after assembly.

Accordingly, FIG. 1 shows, in perspective view seen from above, a first embodiment of a guiding means at a joint according to the invention. The guiding means comprises groove 1 and tenon 2 which usually is intended to be joined by using glue. The tenon 2 comprises guiding wedges 3 on the upper and lower sides. The fitting clearance between the groove 1 and tenon 2 includes a first and a second, guiding, fitting clearance, which second, guiding, fitting clearance is obtained by the guiding wedges 3. The first fitting clearance forms the main part of the fit while the second, guiding, fitting clearance forms a smaller part of the fit. The first fitting clearance is approximately 0.2 mm while the second, guiding fitting clearance is approximately 0.05 mm. The guiding wedges 3 are arranged parallel to the extension of the joint. The same embodiment is shown assembled in FIG. 2.

Figure 3:
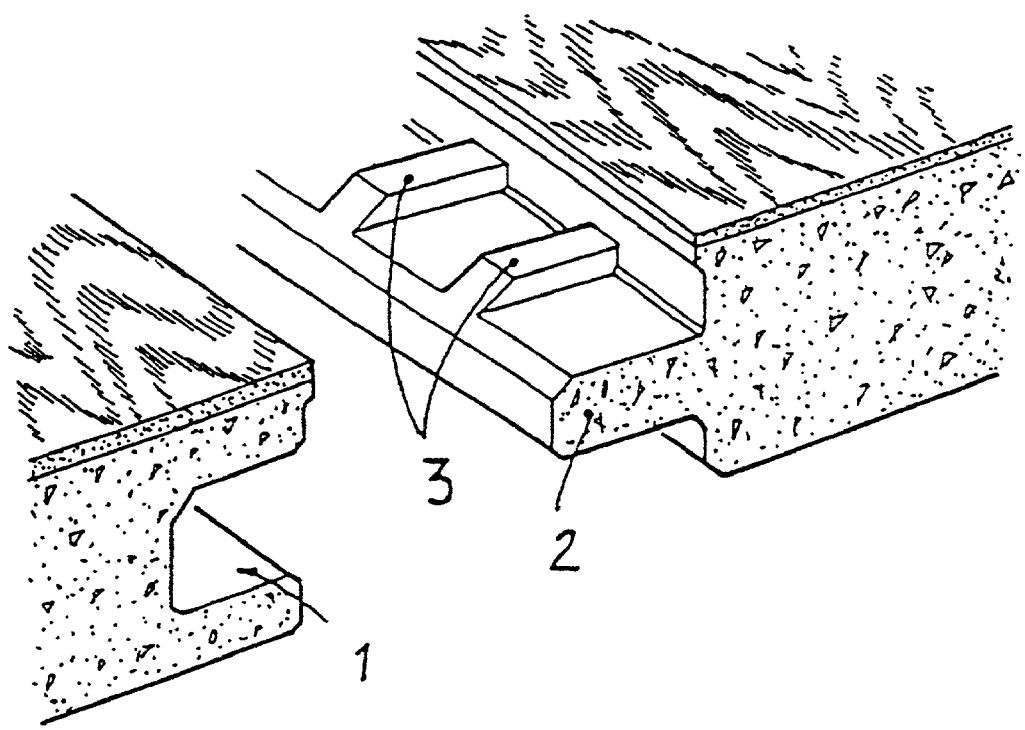
FIG. 3 shows, in perspective view, a second embodiment of a guiding means at a joint, according to the invention.

The groove and tenon are preferably joined with glue. Such glue may be applied during the manufacture of the groove and/or tenon. When the glue is applied during manufacture, it is preferably activated before the tenon is joined with the groove to form the joint of the invention. As shown in FIG. 3, the cavities 4 are sized and shaped so as to receive the glue during assembly of the joint.

The respective surfaces of the joint are provided with recesses so that cavities 4 are formed in the joint. The cavities 4 are intended to receive the glue used at the assembly. The guiding means comprises a part of boards intended to, together form a floor whereby the core of the board is constituted by fibre board or a particle board and at least the upper side of the board is constituted by a decorative thermosetting laminate.

Figure 4:
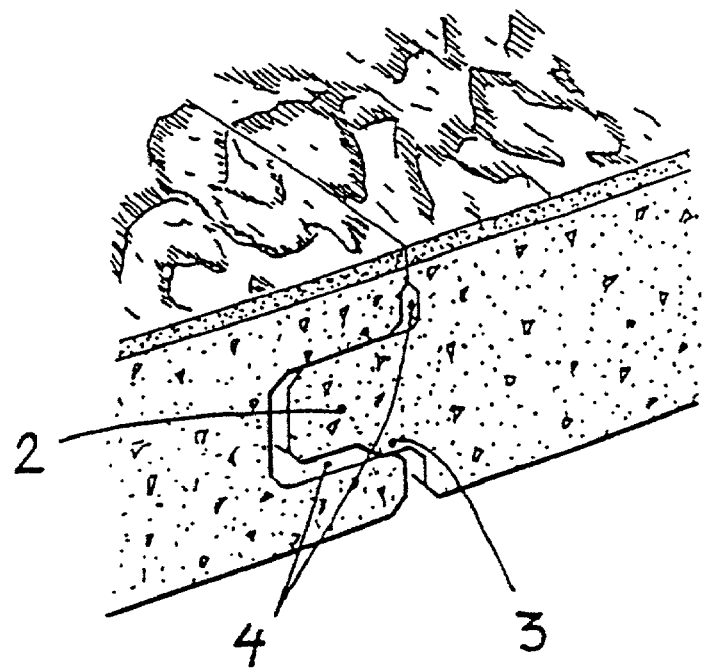
FIG. 4 shows, in perspective view, a third embodiment of a guiding means at a joint, according to the invention.

As shown in FIG. 4, the cavities 4 are bounded by the groove 1 and tenon 2, such that the cavities 4 are formed therebetween. In other words, the cavities have a closed cross-section.

FIG. 3 shows, in perspective view seen aslant from above, a second embodiment of a guiding means at a joint, according to the invention. The embodiment conforms in general with the one described in connection to FIGS. 1 and 2. The tenon 2 is, however, provided with guiding wedges arranged perpendicularly to the extension of the joint.

FIG. 4 shows, in perspective view seen aslant from above, a third embodiment of a guiding means at a joint, according to the invention. The embodiment is shown assembled. The embodiment corresponds in general to the one described in connection to FIGS. 1 and 2, the tenon 2 is however provided with guiding wedges 3 only at the lower side.

The invention is not limited by the embodiments shown since these can be varied in different ways within the scope of the invention. Guiding wedges 3 can, for example, be arranged inside the groove 1. If these guiding wedges 3 are parallel to the extension of the joint, they are suitably arranged in the bottom of the groove 1 while they can be given a shape similar to the one shown in FIG. 3 if they are arranged perpendicularly to extension of the joint.

We claim:

1. A process for forming a joint between adjacent boards, said boards comprising an upper surface and a core, and bounded by edges, at least one of said edges comprising a groove or tenon intended to be joined by means of glue applied during manufacture of said boards, wherein a fitting clearance between the tenon and the groove includes a first fitting clearance, the first fitting clearance being bounded by a distal end of the tenon and a proximal part of the groove, and a second, guiding, fitting clearance, which second, guiding, fitting clearance being bounded by, on at least one side, a guiding wedge, whereby the first fitting clearance comprises a main part of a fit of the joint and the second, guiding, fitting clearance comprises a smaller part of the fit, said guiding wedge comprises and a distal angled surface extending from said distal angled section to said core, and the further comprising at least a second guiding wedge, wherein the guiding wedges are arranged perpendicular to the extension of the joint, said process comprising assembling the adjacent boards to form said joint.

2. A process according to claim 1, wherein the glue is activated before joining the tenon with the groove.

3. The guiding means according to claim 2, wherein the core of the boards is constituted by a fibre board or a particle board and that at least said upper surface of the board is constituted by a decorative thermosetting laminate.

4. The guiding means according to claim 1, wherein the core of the boards is constituted by a fibre board or a particle board and that at least said upper surface of the board is constituted by a decorative thermosetting laminate.

5. The process of claim 1, wherein said glue is applied to said at least one edge.

6. A guiding means at a joint between adjacent boards, said boards comprising an upper surface, and a core, and bounded by edges, at least one of said edges comprising a groove or tenon, said groove or tenon comprising a plurality of guiding wedges, wherein the tenon has an angled distal surface and at least one of said guiding wedges is positioned between said angled distal surface and the core, wherein a fitting clearance between the tenon of a first of said boards and a groove of the adjacent board includes a first fitting clearance, the first fitting clearance being bounded by the distal end of the tenon and a proximal part of the groove, and a second, guiding, fitting clearance, which second, guiding, fitting clearance being bounded by, on at least one side, at least one of said plurality of guiding wedges, whereby the first fitting clearance comprises a main part of a fit of the joint and the second, guiding, fitting clearance comprises a main part of a fit of the joint and the second, guiding, fitting clearance comprises a smaller part of the fit, and said at least one of said plurality of guiding wedges comprises a distal angled surface and a section extending from said distal angled surface of said guiding wedge to said core, wherein the plurality of guiding wedges are arranged perpendicular to the extension of the joint, wherein glue is applied during a manufacturing process of the boards.

7. The guiding means according to claim 6, wherein the first fitting clearance is in the range 0.1-1 mm, while the second, guiding, fitting clearance is in the range 0.01-0.2 mm.

8. The guiding means according to claim 7, wherein the core of the boards is constituted by a fibre or a particle board and that at least said upper surface of the board is constituted by a decorative thermosetting laminate.

9. The guiding means according to claim 6, wherein the first fitting clearance is in the range of 0.1-0.5 mm and the second fitting clearance is in the range of 0.02.-0.1 mm.

10. The guiding means according to claim 9, wherein the core of the boards is constituted by a fibre board or a particle board and that at least said upper surface of the board is constituted by a decorative thermosetting laminate.

11. The guiding means according to claim 6, wherein the first fitting clearance is in the range 0.1-0.5 mm, while the second, guiding, fitting clearance is in the range of range 0.01-0.1 mm.

12. The guiding means according to claim 11, wherein the core of the boards is constituted by a fibre board or a particle board and that at least said upper surface of the board is constituted by a decorative thermosetting laminate.

13. The guiding means according to claim 6, wherein the core of the boards is constituted by a fibre board or a particle board and that at least said upper surface of the board is constituted by a decorative thermosetting laminate.

14. The guiding means according to claim 6, wherein the core of the boards is constituted by a fibre board or a particle board and that at least said upper surface of the board is constituted by a decorative thermosetting laminate.

15. The guiding means according to claim 6, wherein said guiding wedge consists of a distal angled surface and a section extending from said distal angled section to said core.

* * * * *